United States Patent
Chu et al.

(10) Patent No.: US 8,391,259 B2
(45) Date of Patent: Mar. 5, 2013

(54) BROADCAST/MULTICAST COLLISION FREE FRAME TRANSMISSION

(75) Inventors: Liwen Chu, San Jose, CA (US); George A. Vlantis, Sunnyvale, CA (US)

(73) Assignee: STMicroelectronics, Inc., Coppell, TX (US)

( * ) Notice: Subject to any disclaimer, the term of this patent is extended or adjusted under 35 U.S.C. 154(b) by 1028 days.

(21) Appl. No.: 12/392,013

(22) Filed: Feb. 24, 2009

(65) Prior Publication Data

US 2009/0213776 A1    Aug. 27, 2009

Related U.S. Application Data

(60) Provisional application No. 61/031,586, filed on Feb. 26, 2008.

(51) Int. Cl.
*H04Q 7/24* (2006.01)
*H04L 12/413* (2006.01)

(52) U.S. Cl. ......... 370/338; 370/445; 370/447; 370/461

(58) Field of Classification Search .................. None
See application file for complete search history.

(56) References Cited

U.S. PATENT DOCUMENTS

| | | | |
|---|---|---|---|
| 2003/0123405 A1 | 7/2003 | del Prado et al. | |
| 2007/0160007 A1* | 7/2007 | Wang et al. | 370/331 |
| 2007/0177574 A1* | 8/2007 | Park et al. | 370/350 |
| 2008/0026758 A1* | 1/2008 | Murakami | 455/436 |
| 2008/0310325 A1* | 12/2008 | Yang | 370/254 |
| 2009/0154393 A1* | 6/2009 | Hsu et al. | 370/328 |
| 2009/0274101 A1* | 11/2009 | Sakoda et al. | 370/328 |
| 2010/0202296 A1* | 8/2010 | Suzuki et al. | 370/241 |
| 2011/0019577 A1* | 1/2011 | Nagura | 370/252 |
| 2011/0235559 A1* | 9/2011 | Sakoda | 370/310 |

* cited by examiner

*Primary Examiner* — Andrew Lee
(74) *Attorney, Agent, or Firm* — Hogan Lovells US LLP

(57) ABSTRACT

A protocol for collision avoidance in inter and intra basic service set broadcast/multicast communication in a wireless network is disclosed. An access point reserves a broadcast transmission time and conveys that reservation to each of its associated stations. Using a beacon or an action frame, the transmission reservation time is sent to all stations and other neighboring access points within range of the primary access point. Upon receiving the broadcast transmission time reservation, each station associated with the reserving access point and any neighboring access points set their network allocation vector thus preventing frame transmission or reception during the now reserved transmission time.

20 Claims, 7 Drawing Sheets

BROADCAST/MULTICAST COLLISION FREE FRAME TRANSMISSION

RELATED APPLICATION

The present application relates to and claims the benefit of priority to U.S. Provisional Patent Application No. 61/031,586 filed Feb. 26, 2008, which is hereby incorporated by reference in its entirety for all purposes as if fully set forth herein.

BACKGROUND OF THE INVENTION

1. Field of the Invention

Embodiments of the present invention relate, in general, to wireless communications and particularly to reducing frame collisions during broadcast and/or multicast transmission in a wireless network.

2. Relevant Background

The minimum unit of a wireless Local Area Network ("LAN") is referred to as a Basic Service Set ("BSS"). Each BSS typically comprises an Access Point ("AP") and one or more Stations ("STAs"). Within each BSS the AP periodically performs broadcast transmissions (i.e. a transmission to a non-specific number of receivers without designating the address where data is to be transmitted. A multicast transmission is a transmission of the same message to multiple, designated receivers.) of a beacon frame. Within the beacon, information is provided enabling each of the STAs to synchronize with the AP. Then, after receiving authentication from an AP and formally becoming associated with that AP, it becomes possible to exchange data frames between the AP and each STA. Lastly, in most instances, after receiving data the STA sends to the AP an acknowledgement frame. In addition, each of the STAs within the BSS in an infrastructure network can also communicate with each other STA within the BSS via the AP or in some instances, directly.

There are, as is know by one skilled in the relevant art, two types of methods for controlling the AP in a wireless LAN. One is referred to as a Distributed Coordination Function ("DCF")/Enhanced Distributed Channel Access ("EDCA") and the other is a Point Coordination Function ("PCF")/HCF Controlled Channel Access ("HCCA"). DCF/EDCA is essential in a wireless LAN system while PCF/HCCA is generally considered an optional function.

DCF/EDCA is a communication control system in which each AP/STA within a network has equal transmission rights. In DCF/EDCA, each AP, or the STA to which a transmission is requested, awaits transmission for a period of time; that period of time is determined by adding random-number time, referred to as Random Back Off, to a fixed time, referred to as the Distributed Interframe Space. PCF/HCCA, on the other hand, is a system in which the AP performs transmission control of each STA within the BSS. The AP distributes transmission rights to the STAs in a process referred to as polling. Thus a STA within a BSS in which the AP is using PCF/HCCA can only achieve a frame transmission when it obtains a transmission right from that AP. The interval of frame transmission in the PCF/HCCA is generally defined to be a shorter time period than the Distributed Interframe Space. This shorter time period is referred to as Short Interframe Space.

In IEEE802.11, each parameter for practicing PCF/HCCA/DCF/EDCA is defined but there is no direction as to a preferential use of either DCF or EDCA or PCF or HCCA or, for that matter, the recommended values for each parameter. Details of the actual use depend on the state of the BSS when either DCF/EDCA or PCF/HCCA is actually used.

In a conventional example, consider a multiple access method (multicast) in which packet communication in a wireless communication medium is established between a plurality of terminals and a wireless base station. The applicable system (DCF/EDCA or PCF/HCCA) is selected based on the reception error rate of the packet signals received by the wireless base station. It remains possible in such an example for frames to collide during transmission.

FIGS. 1a, and 1b show two examples of frame collisions that may occur during a broadcast/multicast transmission as known in the prior art. Inner BSS collisions, shown in FIG. 1a represent the scenario when an AP 110 broadcasts a frame to all of its associated STAs 120, 122, 125 and yet at the same time at least one of the STAs 125 transmits a frame back to the AP 110. The two frames collide resulting in a lower Quality of Service for the BSS.

Similarly, FIG. 1b shows two overlapping BSSs (herein referred to as "OBSS") each having a single AP 130, 140 and their associated STAs 132, 135, 137/152, 155, 157 (respectively). Each AP 130, 140 simultaneously transmits a frame to each of their associated STAs 132, 135, 137/152, 155, 157. STAs 132, 135, 152, 155 which reside in a region exclusively associated with a single transmitting AP receive the frame without difficulty and respond accordingly. However, the STAs residing in 137, 157 overlapping region 160 receive both frame transmissions simultaneously. Furthermore a similar collision can occur when only one AP is broadcasting frames and the other AP and overlapped STA are conducting unicast transmissions which requires the STA to respond.

IEEE standard 802.11 provides an option to minimize or prevent collisions. Current techniques within this area include Hybrid Coordinator Function ("HCF"), Controlled Channel Access, Superframe manipulation, Power Save Multi-polling, and Mesh Deterministic Access. Unfortunately current techniques including those listed above fail to prevent intra BSS and inter BSS frame collision. Embodiments of the present invention address these and other deficiencies of the prior art.

BRIEF SUMMARY OF THE INVENTION

A protocol for collision avoidance in inter and intra BSS broadcast communication is herein presented. According to one embodiment of the present invention, an AP reserves a broadcast transmission time and conveys that reservation to each of its associated stations. Using a beacon or an action frame the reservation time is sent to all stations and other APs within range of the AP. Upon receiving the broadcast transmission time reservation, each STA associated with the AP and any neighboring AP sets a network allocation vector preventing frame transmission during the now reserved transmission time.

The present invention provides a robust means by which to prevent frame collisions not only within a BSS but also between OBSSs. By conveying mutual reserved broadcast transmission times each AP can be assured that its transmission is not collided with and disrupted by other transmissions.

According to another embodiment of the present invention, stations from one BSS can communicate with stations of one or more neighboring APs to relay the broadcast transmission time. Conflicts of transmission times occurring simultaneously between APs can be resolved using a random number or other equitable implementation techniques known to those skilled in the relevant art.

In addition to preventing frame collisions between broadcast and multicast transmission of neighboring APs, another focus of the present invention is to prevent intra collision of frames between stations within the BSS and the controlling AP.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE SEVERAL VIEWS OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1A:
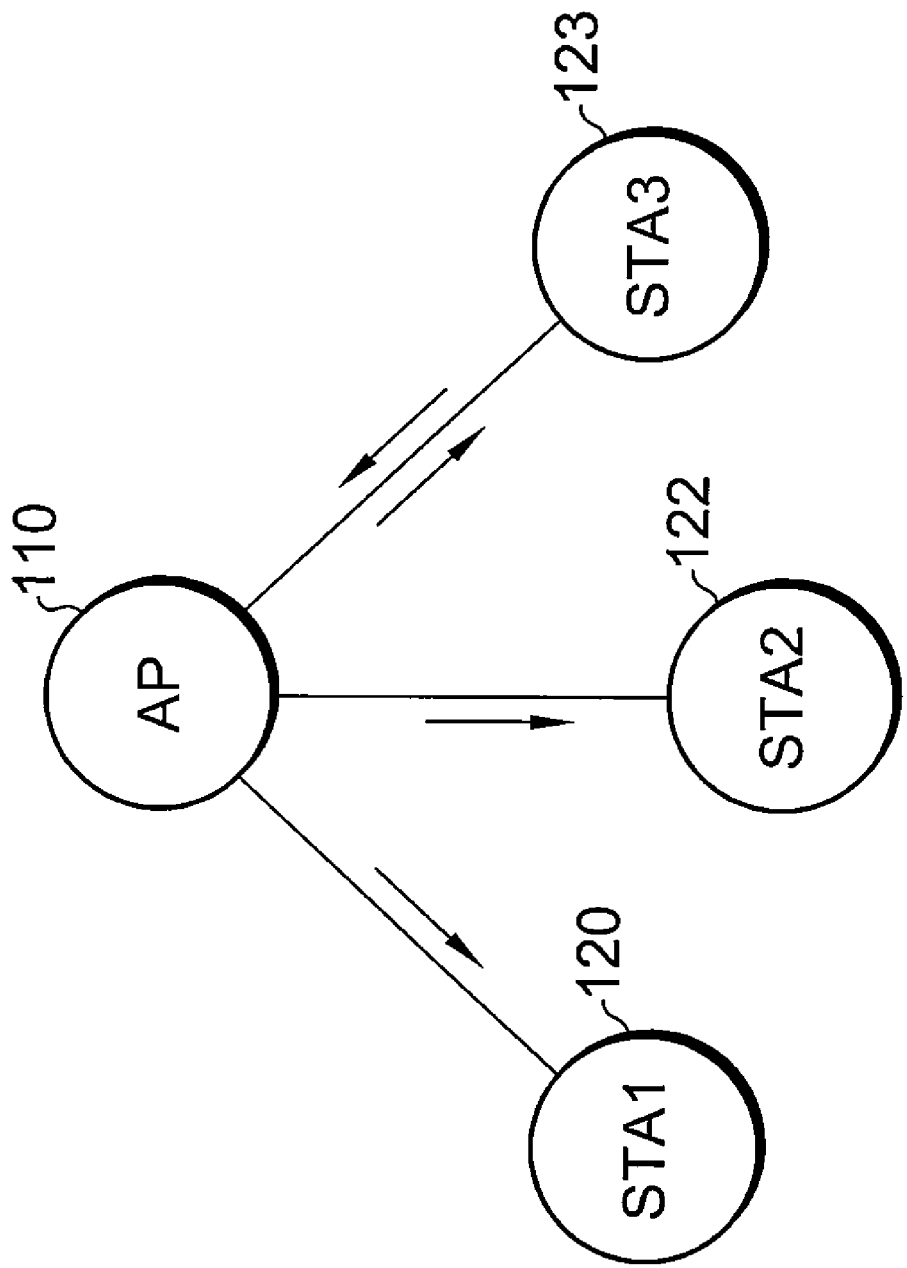
FIG. 1a shows an example of an intra frame transmission collision as is know in the prior art.
Figure 1B:
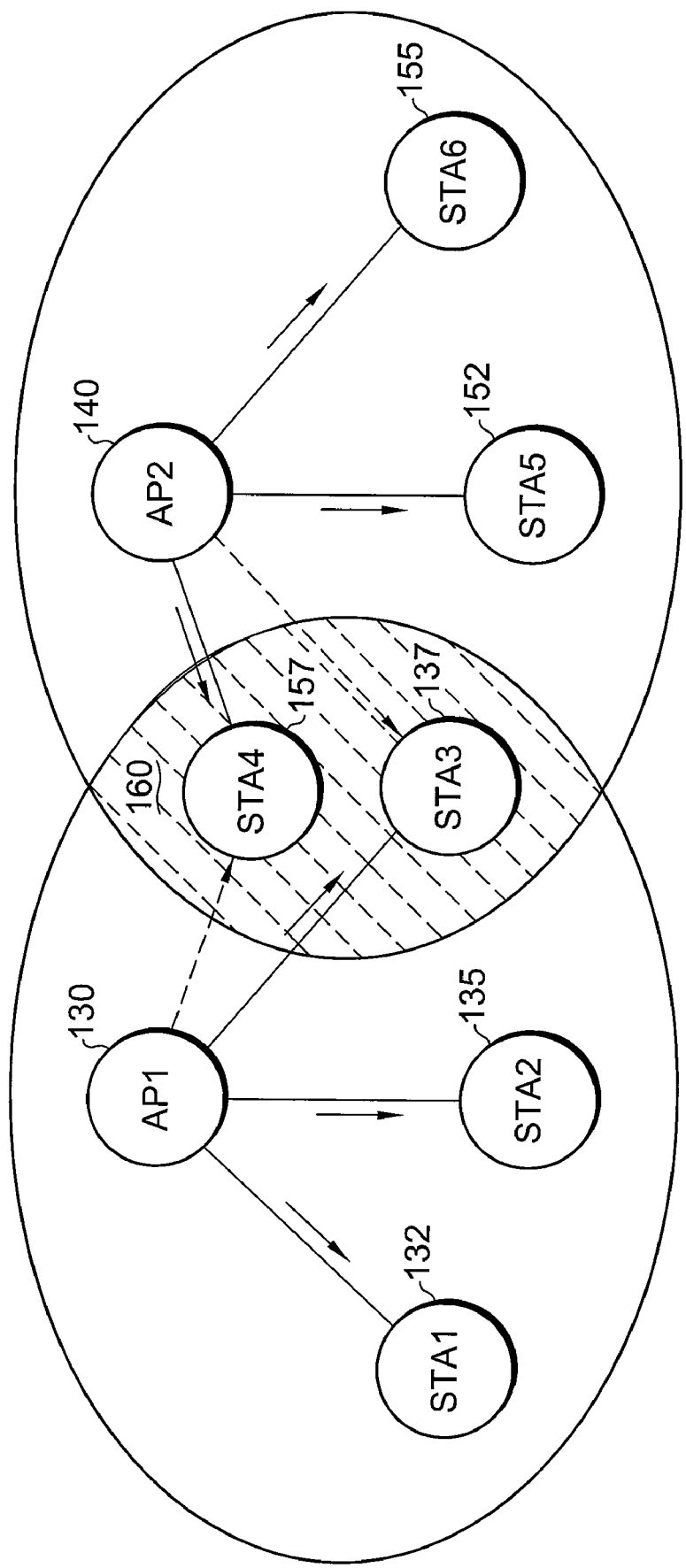
FIG. 1b shows an example of an inter frame transmission collision as is known in the prior art.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

Embodiments of the present invention provide a robust means by which to prevent frame collisions during inter and intra BSS communication. During a broadcast transmission an AP transmits to every receiving station or AP within its reach. As known in the art, a simultaneous transmission by either one of the AP's associated stations or another neighboring/overlapping BSS can collide with the broadcast transmission making the transmission less effective. Embodiments of the present invention prevent such collisions by managing the transmission time of neighboring BSSs and their respective STAs.

With reference once again to FIG. 1a, one embodiment of the present invention prevents intra frame collision as a result of broadcast transmission. As known to one skilled in the relevant art, frame collision is possible between an AP's broadcast transmission and station transmission. According to one embodiment of the present invention, the AP reserves time for periodic broadcast transmission within its respective BSS. Using a beacon frame, new action frame or other comparable management frame, the AP notifies each station within the BSS of the periodic broadcast transmission time. Upon receipt of the designated broadcast transmission time, each station within the BSS sets its respective network allocation vector to stop transmissions during those specified times. In essence, for each of the specified periodic broadcast transmission times, each station within the BSS is in a receptive mode of operation.

Figure 2:
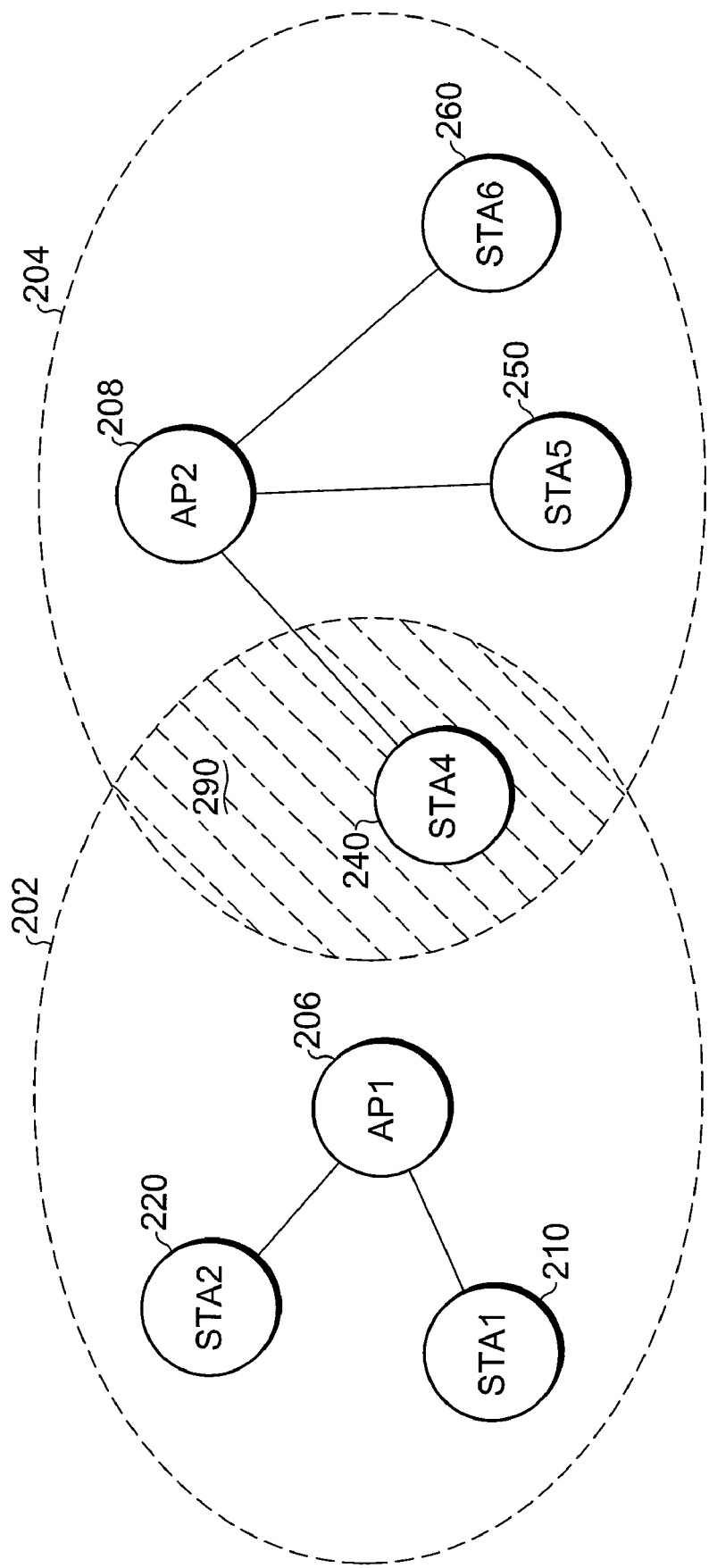
FIG. 2 shows one embodiment of two overlapping BSSs having a common station in the overlapped region in which a reserved broadcast transmission time of one AP is conveyed via the station to the other AP according to one embodiment of the present invention.

FIG. 2 shows two overlapping BSSs in which a reserved broadcast transmission time is implemented according to one embodiment of the present invention. As with intra reservation of a broadcast transmission time, inter reservation of broadcast transmission time involves the conveyance of the reservation via management communication frames to neighboring APs and STAs. FIG. 2 depicts two overlapping BSSs 202, 204, each with a respective AP 206, 208. Within the overlapping region 290 exists station 4 240 which is associated with AP2 208. Also associated with AP2 208 are stations 5 250 and 6 260. Similarly two stations, station 2 220 and station 1 210, are associated with AP1 206. Note the overlapping region is void of any stations associated with AP1 206.

As previously described with respect to intra BSS broadcast time reservation, AP1 206 conveys a broadcast time reservation to its stations, STA1 210 and STA2 220. However, since STA4 240 is within the influence of AP1 206 it too receives the action message. According to one embodiment of the present invention, upon receipt of such a message, STA4 240 relays the upcoming or periodic broadcast transmission reservation timing of AP1 206 to AP2 208. And as STA4 240 remains within the coverage of AP1 206 it, like the station associated with AP1 206, restricts both its reception of frames from its own BSS (AP2) and its transmission of normal acknowledgement frames to other stations within its BSS.

In the same manner, upon notification of AP1's reservation period by a message conveyed from STA4 240, AP2 208 restricts its broadcast periods so as to not coincide with those of AP1 206, nor does it conduct directed communication to one or more stations when those stations would include stations residing in the overlapping region 290, which in this case includes STA4 240.

Figure 3:
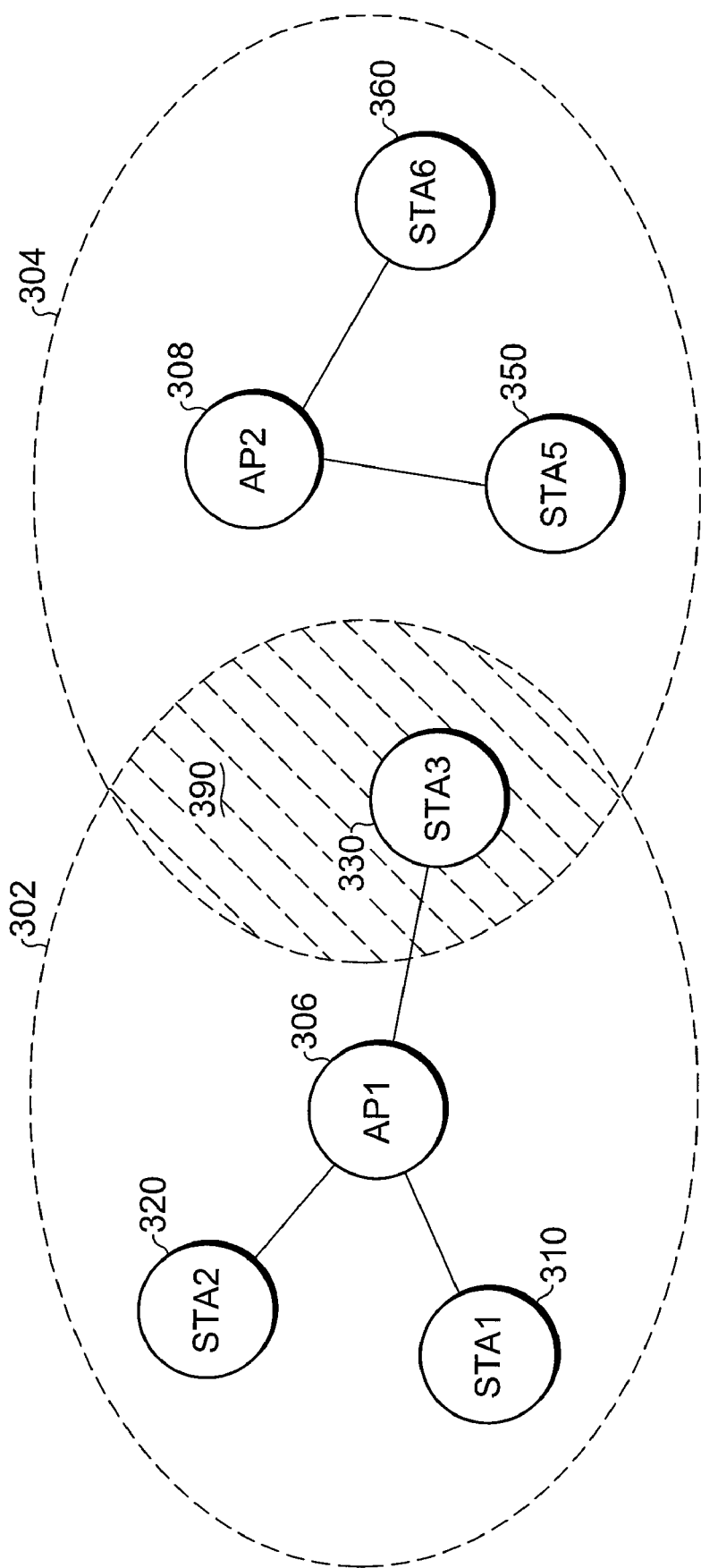
FIG. 3 shows another embodiment of two overlapping BSSs having a common station in the overlapped region in which a reserved broadcast transmission time of one AP is conveyed via the station to the other AP according to one embodiment of the present invention.

FIG. 3 shows another rendition of two overlapping BSSs in which a reserved broadcast transmission time is implemented according to one embodiment of the present invention. As with FIG. 2, two APs 306, 308 form two BSSs 302, 304 that intersect forming an overlapped region 390. Associated with each AP are stations. For example STA1 310, STA2 320, and STA3 330 are associated with AP1 306 while STA5 350 and STA6 360 are associated with AP2 308.

Upon selection of a broadcast transmission time, AP1 306 notifies each station within its BSS, namely STA1 310, STA2 320 and STA3 330. STA3 330, however recognizes that it is not only within the sphere of influence of AP1 306 but also that of AP2 308. Accordingly, using an action message, STA3 330 relays AP1's reserved broadcast transmission time to AP2 308.

AP2 308, upon receipt of the message, restricts its broadcast transmissions to times other than that chosen by AP1 306. Furthermore, to fully protect video transmission, AP2 308 restricts its ability to receive normal acknowledgement frames from its associated stations during the reserved broadcast transmission of AP1 306.

Figure 4:
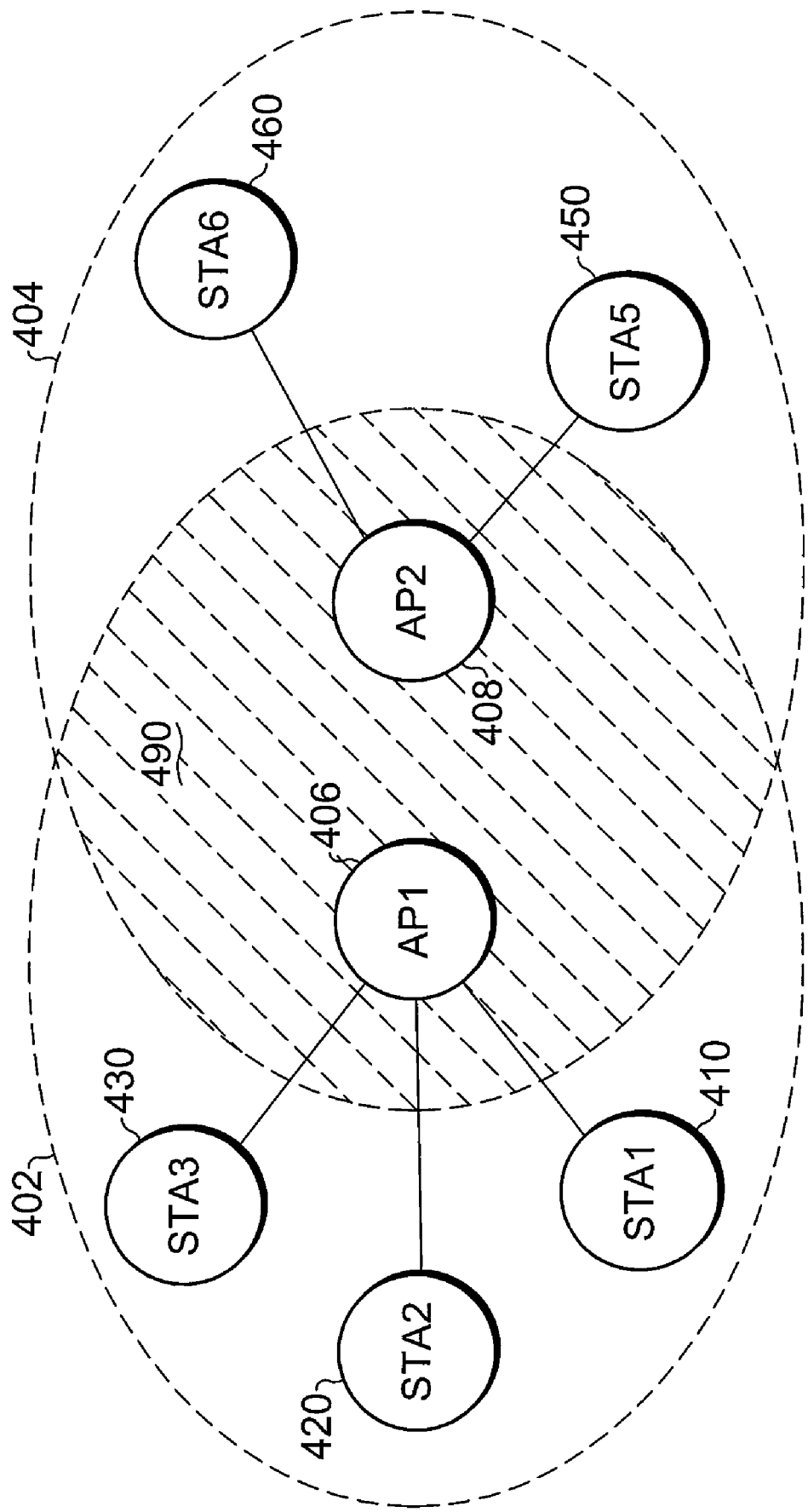
FIG. 4 shows two overlapping BSSs in which each AP is within the BSS of the other AP and in which reserved transmission times are conveyed directly according to one embodiment of the present invention.

Just as a STA can exist within an overlapping region of BSS's, so too can an access point exist within the influence of a neighboring BSS. FIG. 4 shows two overlapping BSSs in which each access point is within the influence of another. According to one embodiment of the present invention, reserved respective broadcast transmission times are communicated/broadcast/announced to prevent frame collision between APs and their associated stations.

As shown, each AP is associated with one or more stations. AP1 406 is associated with STA1 410, STA2 420 and STA3 430. Similarly AP2 408 is associated with STA5 450 and STA6 460. Note that no stations exist within the overlapping region 490 yet both AP1 406 and AP2 408 are within each other's sphere of influence.

According to one embodiment of the present invention, when AP2 408 receives directly a reserved broadcast transmission time from AP1 406, AP2 408 restricts its unicast transmissions so as to avoid a conflict. Accordingly AP2 408 will not transmit unicast frames with an acknowledgement requirement to its associated stations or receive normal acknowledgement frames from its associated stations. But, as there are no stations residing in the overlap region 490, AP2 408 can continue to issue broadcast/multicast transmission without restriction or any fear of frame collision.

Figure 5:
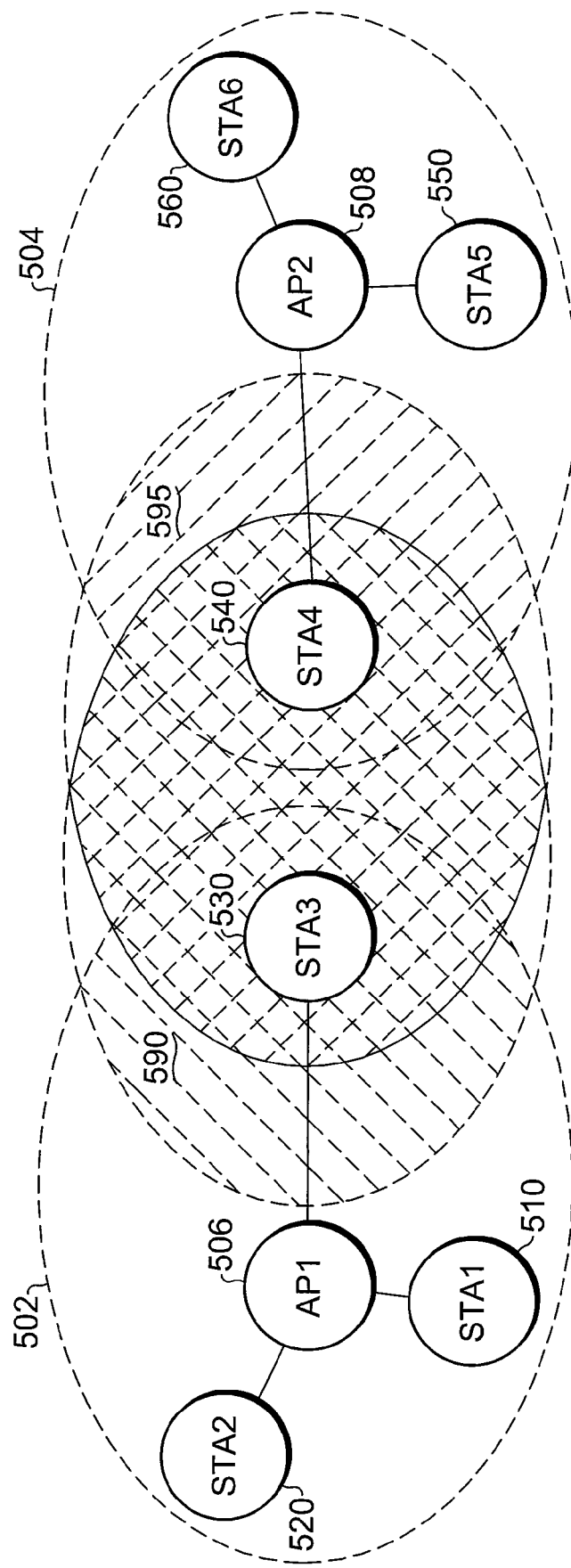
FIG. 5 shows an embodiment of the present invention for reserving AP broadcast transmission time in which two non-overlapping BSSs each have a multiple stations in which the transmission range of at least two of the stations of the respective BSSs overlap.

FIG. 5 shows yet another scenario in which broadcast transmissions can, according to one embodiment of the present invention, be reserved so as to prevent frame collision. Two BSSs 502, 504 are shown, each being attributed to a respective AP 506, 508. And like the previous examples, each AP is associated with one or more STAs. In this case AP1 is associated with STA1 510, STA2 520, and STA3 530. AP2 508 is similarly associated with STA4 540, STA5 550 and STA6 560.

While in this scenario the BSSs attributed to AP1 506 and AP2 508 do not overlap, the transmission/reception range of at least two of the stations do overlap. As one skilled in the art will recognize, just as an access point exhibits an area or region in which it can transmit and receive, so to do each of the stations. Clearly for a station to remain associated with a particular access point it must be able to not only receive communication from the access point but to transmit replies. Thus each station has associated with it its own area of influence.

FIG. 5 depicts the two intersecting areas of influence 590, 595 that represent the transmission/reception range for STA3 530 and STA4 540 respectively. One skilled in the art will recognize that all stations within both BSSs possess similar areas of influence, but for purposes of this illustration only those of STA3 530 and STA4 540 are shown. With reference once again to FIG. 5, it can be seen that even though the two BSSs 502, 504 do not overlap, STA3's area of influence 590 and STA4's area of influence 540 do intersect.

As STA3 530 learns of AP1's 506 broadcast transmission reservation time, it will attempt to convey that to other stations within its BSS and any neighboring AP via a new action message. STA4 540 will receive that message. To ensure that collisions do not occur during AP1's broadcast transmission, STA4 540, according to one embodiment of the present invention, restricts its transmission and reception of unicast frames with AP2 508 so as to not occur during the reserved broadcast transmission time. In addition, STA4 540, having received the transmission time from STA3 530, relays AP1's transmission time further to AP2, which can then adjust its unicast transmission to STA4 540 accordingly.

Each of the previously presented scenarios have been explained by virtue of a single access point, AP1, making a broadcast transmission reservation time and notifying both the stations within its BSS as well as those stations and access points neighboring the BSS of that reserved time. One skilled in the art will recognize that, while the examples herein depict a single AP making and notifying other stations/access points of its reservation, the present invention is not limited to this singular application. Indeed the present invention is operable to schedule multiple reservation periods for broadcast transmission among a plurality of access points and their associated stations. By following the principles of the present invention described herein, frame collision as a result of broadcast transmissions can be eliminated.

Likewise frame collisions that occur during multicast transmissions can also be eliminated by abiding to the concepts of the present invention. As previously described, a broadcast transmission is one in which a transmission is presented without any designation of the receivers. By contrast, a multicast transmission also involves multiple, simultaneous transmissions but rather than a message being transmitted to an arbitrary number of recipients, it is directed to a specific list of multiple targets. As with broadcast transmissions, multicast transmission can lead to frame collisions. The techniques and concepts of the present invention as described herein are equally applicable to multicast transmissions. Accordingly, implementing a reserved multicast transmission time consistent with the techniques of the present invention can eliminate frame collision.

Figure 6:
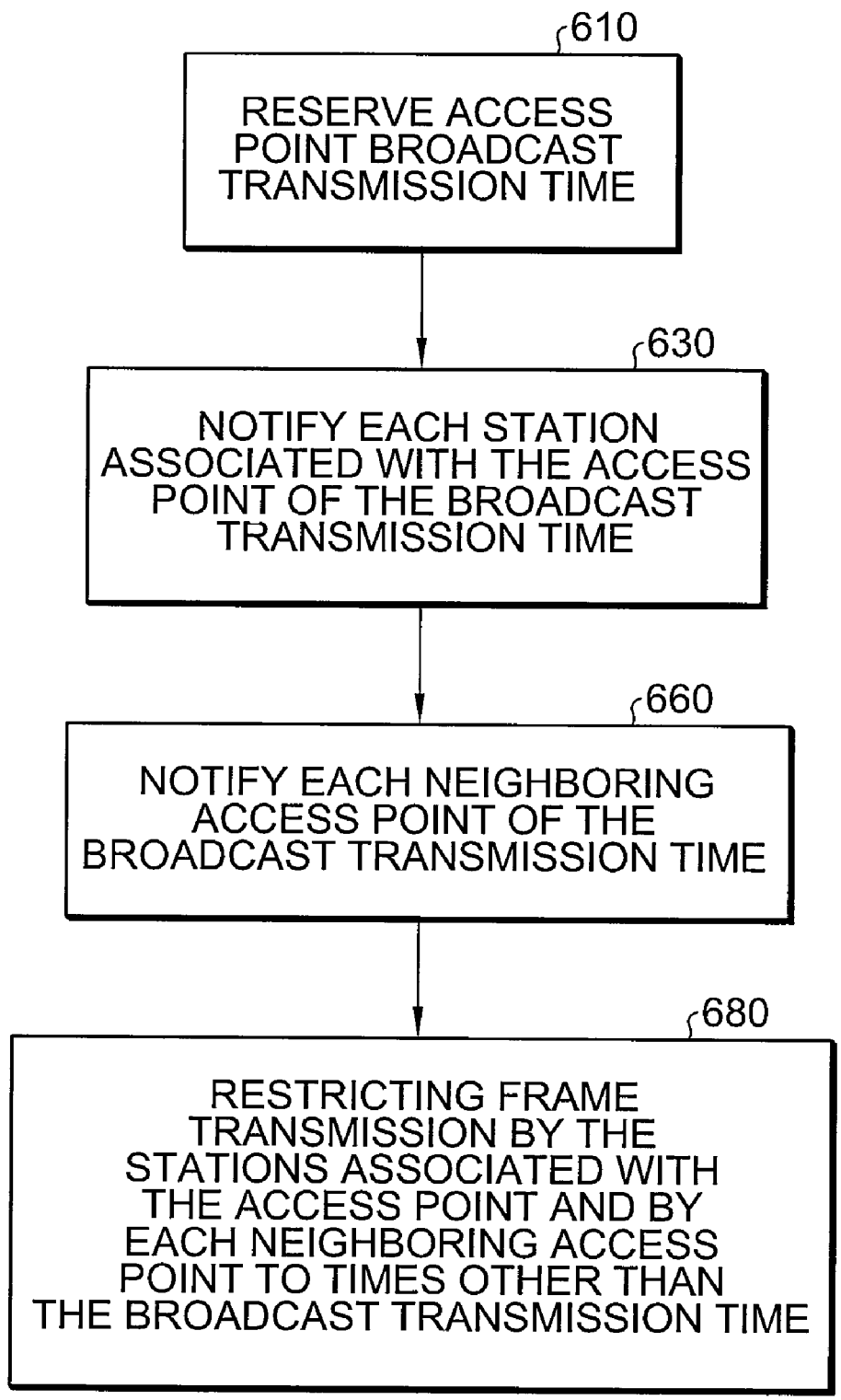
FIG. 6 is a flowchart of one method embodiment for preventing frame collisions in broadcast/multicast transmissions within and among BSSs according to the present invention.

FIG. 6 is flowchart illustrating a method for implementing an exemplary process for preventing frame collision during multicast and broadcast transmission in a wireless network. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

According to one method embodiment of the present invention an AP identifies and reserves 610 a period of time during which it will conduct broadcast and/or multicast transmissions. The selection of the time period may be random or in conjunction with a deconfliction or negotiation process involving neighboring access points.

Upon selection of a transmission time, the access point thereafter notifies 630 each station associated with the access point (i.e. within the BSS). In addition and according to another embodiment of the present invention, the access point also notifies 660 each neighboring access point either directly or via commonly shared stations.

Responsive to receiving a beacon or action message containing a reserved broadcast/multicast transmission time of an access point, each station associated with that access point and each neighboring access point restricts 680 frame transmissions to times other than the reserved broadcast/multicast transmission time.

By restricting transmission to and from affected station and access points, frame collisions are eliminated increasing the effectiveness of the broadcast/multicast transmission considerably.

Disclosed herein is a protocol for preventing frame collisions during broadcast and/or multicast transmissions in a wireless network. It will be readily recognized by one skilled in the relevant art that these processes can take place in both an access point and/or a station. Modules and or engines can be implemented via computing machines located in each device utilizing technology known to one skilled in the art. Indeed some of the embodiments presented herein can be implemented via software code executed on a process or alternatively via firmware. Also the concepts presented herein may be hard coded into circuitry as a means to increase, among other things, efficiency and performance.

While the invention has been particularly shown and described with reference to embodiments, it will be understood by those skilled in the art that various other changes in the form and details may be made without departing from the spirit and scope of the invention. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

While there have been described above the principles of the present invention in conjunction with preventing frame collisions during multicast/broadcast transmission in a wireless network, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A protocol for reducing frame collisions in wireless basic service set communication, said protocol comprising:
   reserving by an access point a broadcast transmission time wherein the access point is associated with a region having at least one station;
   notifying each station associated with the access point of the broadcast transmission time; and
   setting at each station associated with the at least one access point a network allocation vector stopping frame transmission during the broadcast transmission time.

2. The protocol of claim 1 wherein responsive to said station detecting a collision, notifying the access point for reallocation of a new reserved broadcast transmission time.

3. The protocol of claim 1 wherein another neighboring access point exists within the region and responsive to the another neighboring access point receiving the broadcast transmission time of the access point, the other neighboring access point restricts its own broadcast transmissions to times other than the broadcast transmission time of the access point.

4. The protocol of claim 1 wherein at least one other station is associated with another neighboring access point, said other station existing within the region, and wherein notifying includes notifying the other station of the broadcast transmission time of the access point.

5. The protocol of claim 4 wherein responsive to the other station receiving the broadcast transmission time of the access point, the other station restricts its own unicast transmission to times other than the broadcast transmission time of the access point.

6. The protocol of claim 4 wherein the other station relays the broadcast transmission time of the access point to the other neighboring access point.

7. The protocol of claim 6 wherein the other station relays the broadcast transmission time of the access point to the other neighboring access point via a new public action frame.

8. The protocol of claim 6 wherein responsive to the other neighboring access point receiving the broadcast transmission time of the access point from the at least one other station, the other neighboring access point restricts its own broadcast transmissions to times other than the broadcast transmission time of the access point.

9. The protocol of claim 1 wherein notification of the broadcast transmission time is through a management frame.

10. The protocol of claim 9 wherein said management frame includes a beacon.

11. The protocol of claim 9 wherein said management frame includes a new action frame.

12. A system for avoiding broadcast frame collision in a wireless network; the system comprising:
   at least one access point wherein each access point is associated with at least one station and wherein the at least one access point reserves a broadcast transmission time; and
   an action frame operative to distribute the broadcast transmission time to the at least one station and other access points having overlapping coverage with the at least one access point wherein responsive to receiving the action frame the at least one station and/or the other access points restrict transmission to times other than said broadcast transmission time.

13. The system of claim 12 wherein the at least one station can relay the action frame to another station associated with other non-overlapping access points.

14. The system of claim 12 wherein said at least one station restricts transmission time by setting a network allocation vector to stop frame transmission during the broadcast transmission time.

15. The system of claim 12 wherein the action frame includes information regarding the source of the action frame.

16. The system of claim 12 wherein restriction of broadcast transmission by other access points responsive to receiving an action frame is based on whether the action frame is received from one or more stations associated with the other access point.

17. A computer-readable storage medium tangibly embodying a program of instructions executable by a machine wherein said program of instructions comprises a plurality of program codes for preventing frame collisions in broadcast transmission in a wireless network, said program of instructions comprising:
   one of said program codes for reserving by an access point a broadcast transmission time wherein the access point is associated with a region having at least one station;
   one of said program codes for notifying each station associated with the access point of the broadcast transmission time; and
   one of said program codes for setting at each station associated with the at least one access point a network allocation vector stopping frame transmission during the broadcast transmission time.

18. The computer-readable storage medium of claim 17 wherein said program of instructions further comprises program code for reallocating a new reserved broadcast transmission time responsive to detecting a frame collision.

19. The computer-readable storage medium of claim 17 wherein responsive to another neighboring access point existing within the region, said program of instructions further comprises program code for restricting the other neighboring access point's own broadcast transmissions to times other than the broadcast transmission time of the access point.

20. The computer-readable storage medium of claim 17 wherein said program of instructions further comprises program code for relaying said broadcast transmission time of the access point to another neighboring access point and wherein responsive to the other station receiving the broadcast transmission time of the access point, the other station restricts its own unicast transmission to times other than the broadcast transmission time of the access point.

* * * * *